C. PFANNE.
Apparatus for Measuring and Saving Liquids.
No. 216,450.                    Patented June 10, 1879.
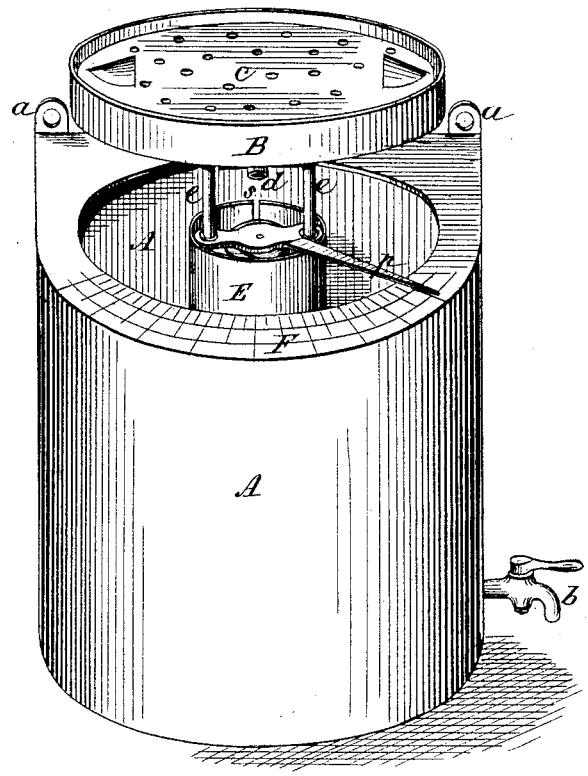
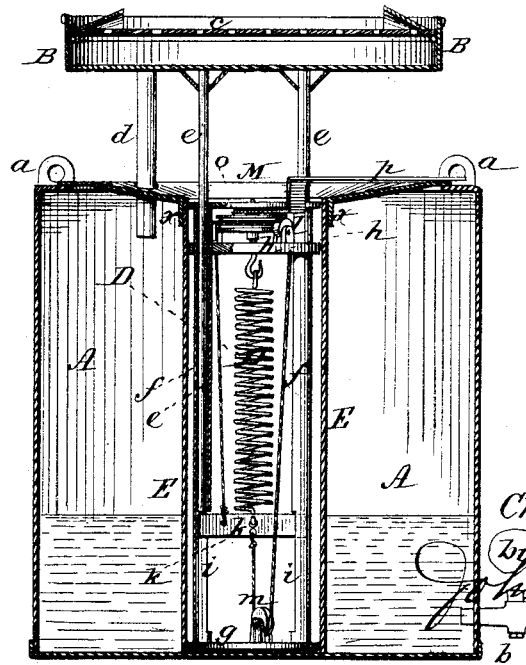
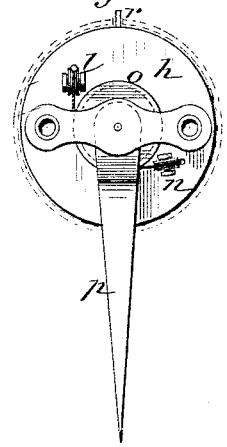

UNITED STATES PATENT OFFICE.

CHARLES PFANNE, OF WASHINGTON, DISTRICT OF COLUMBIA, ASSIGNOR OF ONE-HALF HIS RIGHT TO HERMAN STIEBELING, OF SAME PLACE.

IMPROVEMENT IN APPARATUS FOR MEASURING AND SAVING LIQUIDS.

Specification forming part of Letters Patent No. 216,450, dated June 10, 1879; application filed April 22, 1879.

*To all whom it may concern:*

Be it known that I, CHARLES PFANNE, a subject of the German Emperor, residing at Washington, in the District of Columbia, have invented certain new and useful Improvements in Apparatus for Measuring and Saving Liquids, of which the following is a specification.

This invention relates to the class of inventions called "liquid-measures;" but it comprehends an invention not hitherto exhibited in that class.

The object of my invention is to furnish an apparatus whereby a retailer of beer or alehouse keeper may provide his customers, at short notice, with a pint or other measure of the liquor in the vessel they present. Nevertheless, the uses of the device are not confined to the measuring of malt liquors.

It has been a matter of common notice that upon a purchaser's asking for a pint or a quart of beer, and presenting a pitcher or jug, the tapster has been compelled to lose time while the foam was subsiding in measuring out an exact quantity. Some purchasers insist upon having the vessel first weighed and then filled with a weight of liquor corresponding to the measure demanded. The inconvenience of this is obvious; but my invention, while looking to a remedy for this, seeks also to save the drip for use, as may be desired, and in the manner well known to tapsters.

My invention consists in the combination, with the counter-balance and index of a measuring-scale, of a perforated or drip-support pan or chamber-platform and a drip-receptacle or saving-chamber, and of other matter specified.

In the accompanying drawings, Figure 1 represents a view in perspective of my apparatus; Fig. 2, a vertical section; and Fig. 3, a top view of the index-operating mechanism.

The drip-receptacle or saving-chamber A is of suitable form and attached to the keg, counter, or other part of the furniture of a bar-room in such manner that the drip-supporting pan or chamber-platform B shall be sufficiently below the spigot or tap to permit said chamber-platform to receive the glass, mug, pitcher, or jug, whereby the said vessel may receive its measure of liquor and be conveniently served to the purchaser. This saving-chamber A may rest on a suitable stand or platform, or may hang from its attaching-lugs *a a*, and it has a waste-cock or spigot, *b*, from which the accumulated drip may be drawn.

The chamber-platform B is a pan, preferably circular, provided with a false perforated bottom, *c*, which latter is removable for the purpose of cleaning the chamber. It also has an escape-spout, *d*, from which the liquid flows into the saving-chamber.

The supports for the chamber-platform B consist of two rods or stems, *e e*, which are adapted to move vertically in hollow guide-standards *f f*, which latter rise from a bottom disk, *g*, resting upon the bottom of the saving-chamber A when the apparatus is in operation. There is a counter-balance, D, between these guides *f*, attached at the top to a disk, *h*, and at the bottom to a cross-head, *k*, the latter being adapted to move up and down in slots *i i* of said guides a sufficient distance.

Pulleys and cords *l m n o* operate the index-pointer *p* as the said cross-head descends, and it is caused to descend by the pressure brought upon it by the stems *e e*, which bear down upon it at each side as the weight of the jug being filled upon the chamber-platform B increases, and which rise again when the jug or pitcher is lifted off the said platform.

I provide for the weighing mechanism just described a tubular inclosing-case, E, well assured at the bottom against percolation of liquid, and rising centrally from the bottom of the saving-chamber, and from which the said weighing mechanism may be removed when desired. A detent, *r*, on the disk *h* and a slot, *s*, in the case E prevent the weighing mechanism from turning.

The saving-chamber has a semicircular front, preferably; but this is only made so for convenience, and for the purpose of having a marked scale of measures, F, capable of being reached at all points by the index-pointer *p* in its movement; but the chamber might be square, and have a proper scale-plate attachment.

The scale may have a single, double, or triple row of measures, according to the liquids dispensed from the apparatus; but in beer and and ale generally the relation of weight to liquid or wine measure is of a pound to the pint, and so on. This is a matter already well known, and the scale should be gaged and the weighing mechanism made in accord with rules familiar to skilled mechanics.

The purpose of the invention has been pointed out, and a sufficient description given to enable any skilled mechanic to make and use it, when reference is made to the drawings.

In using the apparatus, place the beer-mug, pitcher, or other vessel upon the chamber-platform, and, looking at the scale, its weight will be indicated—say, at two pounds. It is only necessary then to let the beer flow into it from the spigot until the scale indicates three pounds, when the purchaser is furnished with an exact pint of beer.

It will be observed that all the parts of my apparatus are capable of separation for cleaning purposes—a matter of considerable importance.

It will be seen also that every particle of the overflow from glass or pitcher is saved for the spout $d$ from the chamber-support pan discharges into the saving-chamber.

The pan or chamber-platform B is supported at a height above the saving-chamber sufficient to permit of the proper descent to make the requisite measures.

Every part of the apparatus may be stamped out of metal except some minor parts, and it can be manufactured for an almost insignificant cost, and will readily sell.

For the purpose of excluding flies and gnats, I provide a cover, M, for the saving-chamber. This cover has a central collar, X, which fits over the inclosing-case E. It is supported upon the flanged rim of the saving-chamber. This cover also, to a certain extent, preserves the beer in the chamber from contact with the air. A simple gauze covering would be enough to exclude insects.

I am aware that measuring-cups have been devised for indicating the measure of liquids by weight, and that numerous liquid-measuring appliances have been used wherein the drip returns to the reservoir. Such matters are utterly foreign to my purpose, and comprehend utterly different mechanisms. My design and purpose have been fully stated above.

I claim—

1. In an apparatus for measuring and saving liquids, the combination of the counter-balance and index of a spring-scale with a discharging chambered perforated support-pan for the vessel to be filled and a saving-receptacle, substantially as and for the purpose described.

2. In an apparatus for measuring and saving liquids, the combination, with the counter-balance mechanism, of an inclosing-case, E, a saving-chamber, A, and a chambered support-pan, B, provided with a spout, $d$, all substantially as described.

In testimony whereof I have hereunto set my hand in the presence of two witnesses.

CHARLES PFANNE.

Witnesses:
   A. E. H. JOHNSON,
   J. W. HAMILTON JOHNSON.